(12) United States Patent
Bradenbaugh

(10) Patent No.: US 6,915,069 B2
(45) Date of Patent: Jul. 5, 2005

(54) TEMPERATURE SENSOR ASSEMBLY, WATER HEATER INCLUDING THE TEMPERATURE SENSOR ASSEMBLY, AND METHOD OF SENSING A TEMPERATURE

(76) Inventor: Ken A. Bradenbaugh, 10100 Pinecrest Rd., Concord, OH (US) 44077

( * ) Notice: Subject to any disclaimer, the term of this patent is extended or adjusted under 35 U.S.C. 154(b) by 0 days.

(21) Appl. No.: 10/618,784

(22) Filed: Jul. 14, 2003

(65) Prior Publication Data
US 2005/0013596 A1 Jan. 20, 2005

(51) Int. Cl.[7] .................................................. F24H 1/18
(52) U.S. Cl. ....................................... 392/449; 392/498
(58) Field of Search ............................... 392/441–449, 392/498, 503

(56) References Cited

U.S. PATENT DOCUMENTS

| | | | |
|---|---|---|---|
| 2,561,474 A | * | 7/1951 | Ingels ......................... 392/501 |
| 3,016,412 A | | 1/1962 | Ross |
| 3,217,138 A | * | 11/1965 | Drugmand .................. 392/457 |
| 3,992,608 A | * | 11/1976 | Snavely ....................... 392/455 |
| 4,321,828 A | | 3/1982 | Grimes et al. |
| 4,331,861 A | | 5/1982 | Meixner |
| 4,657,214 A | * | 4/1987 | Foster ....................... 248/176.1 |
| 4,854,730 A | | 8/1989 | Fraden |
| 5,043,692 A | | 8/1991 | Sites et al. |
| 5,582,508 A | | 12/1996 | Chou |
| 5,765,075 A | | 6/1998 | Yamamoto |
| 5,993,061 A | | 11/1999 | Drouet |
| 6,064,801 A | | 5/2000 | Stokes et al. |
| 6,363,216 B1 | | 3/2002 | Bradenbaugh |

* cited by examiner

Primary Examiner—Thor Campbell
(74) Attorney, Agent, or Firm—Michael Best & Friedrich LLP

(57) ABSTRACT

A temperature sensor assembly and method for use in a water heater. The temperature sensor assembly includes a sensor disposed within a non-planar base that at least partially defines a volume, a collector coupled to the base, and a reflector coupled to the base such that the sensor and the reflector are not in thermal contact. The reflector comprises a highly reflective material such that heat from the tank of the water heater is focused on the sensor, thereby increasing the accuracy of the temperature readings of the sensor.

31 Claims, 2 Drawing Sheets

TEMPERATURE SENSOR ASSEMBLY, WATER HEATER INCLUDING THE TEMPERATURE SENSOR ASSEMBLY, AND METHOD OF SENSING A TEMPERATURE

FIELD OF THE INVENTION

The present invention relates generally to temperature sensors. More particularly, the invention relates to methods and apparatus for more efficiently measuring the temperature of an energy source, such as an electric water heater.

BACKGROUND

A storage-type water heater typically comprises a permanently enclosed water tank, a cylindrical shell coaxial with and radially spaced apart from the water tank to form an annular space between the outer wall of the water tank and the inner wall of the shell, and insulating material in at least a portion of the annular space for providing thermal insulation to the water tank. The water tank has various appurtenances such as inlet, outlet, and drain fittings. Additionally, the water heater is provided with a water heating and temperature control system. The water heating and temperature control system includes a heating element to heat the water.

Conventional water heating and temperature control systems typically further include a mechanical thermostat. In electric water heaters, the mechanical thermostat closes a switch to allow electrical power through an electrical resistance heating element when water in the tank is sensed to be below a selected set-point temperature, and opens the switch to stop electrical power from passing through the electrical resistance heating element when the water in the tank is at or above the set point temperature.

Conventional water heaters often employ a bimetallic disk and/or multiple sensors to determine the temperature in a water heater. The readings from these sensors are then averaged and that average is transmitted to the temperature control system to activate the thermostat. These systems are often not cost effective, though, due to the number of sensors required to accurately measure the temperature. It would be beneficial to provide more effective temperature sensing in the conventional water heater to provide for more efficient temperature control of the water heater.

SUMMARY

Accordingly, and in one embodiment, the invention provides a water heater having a water tank, a water inlet to introduce cold water into the tank, a water outlet to remove hot water from the tank, and a heating element. The water heater further includes a temperature sensor assembly adapted to sense a temperature of the water within the tank and coupled to the exterior surface of the tank. The temperature sensor assembly includes a sensor disposed within a non-planar base, a collector coupled to the base and coupled to the tank, and a reflector coupled to the base.

In one construction, the water tank has a characteristic, and the position of the temperature assembly on the exterior of the tank depends on the tank characteristic. In another construction, the non-planar base is arcuate. In another construction, the base comprises a thermally conductive material. In another construction, the sensor includes an NTC thermistor. In another construction, the collector includes a copper foil disk. In another construction, the collector is insulated. In another construction, the reflector comprises a highly reflective material (i.e. aluminum foil). In another construction, the reflector is parabolic in shape and the sensor is placed at the focal point of the reflector. In another construction, the base includes a first surface and a second surface such that the collector is coupled to the first surface and the reflector is coupled to the second surface.

In another embodiment, the invention provides for a temperature sensor assembly including a sensor disposed within a non-planar base, a collector coupled to the base, and a reflector coupled to the base such that the sensor and the reflector are not in thermal contact.

In yet another embodiment, the invention provides for a temperature sensor assembly including a sensor disposed within a thermally conductive arcuate base, an insulated copper foil collector coupled to the base, and a parabolic reflector comprised of highly reflective material coupled to the base.

In another embodiment, the invention provides a method of sensing a temperature of a fluid in a water heater, the method including determining a thermal profile of a water tank in the water heater, coupling a sensor having a sampling area to the exterior surface of the water tank where the position of the sensor on the tank is determined by the thermal profile of the tank, and sensing the temperature of the fluid in the tank by measuring the radiant heat of the water tank.

By combining all of these features, significant energy savings are achieved over conventional water heaters. Other features and advantages of the invention will become apparent to those skilled in the art upon review of the following detailed description, claims and drawings.

DETAILED DESCRIPTION

Before any aspects of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well, as additional items. The terms "connected," "coupled," and "mounted" and variations thereof herein are used broadly and, unless otherwise stated, encompass both direct and indirect connections, couplings, and mountings. In addition, the terms connected and coupled and variations thereof herein are not restricted to physical and mechanical connections or couplings.

Figure 1:
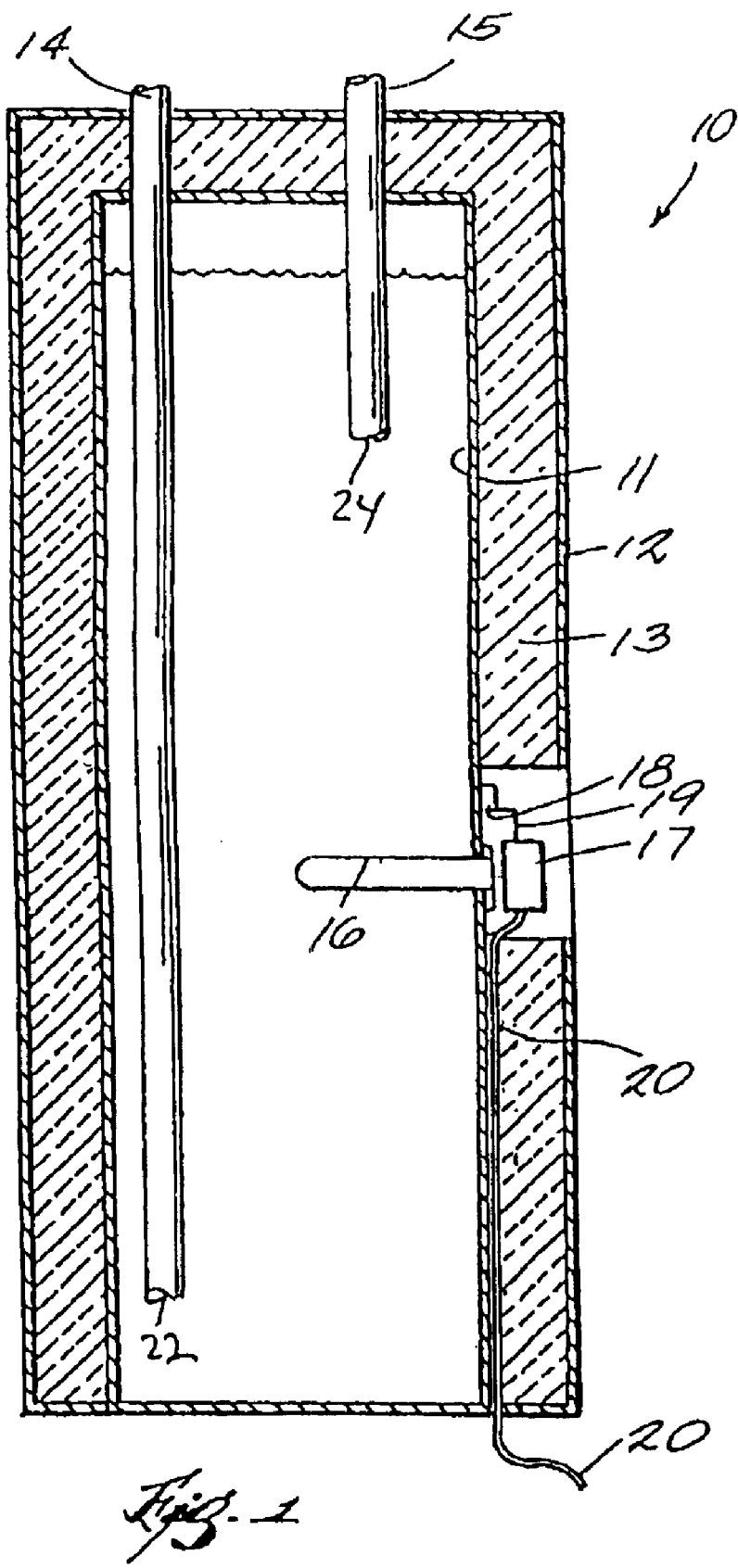
FIG. 1 is a sectional view of a water heater.

FIG. 1 shows a sectional view of an electric water heater 10 comprising an enclosed water tank 11, a shell 12 surrounding the water tank 11, and foam insulation 13 filling the annular space between the water tank 11 and the shell 12. It is understood by those of skill in the art that other types of water heaters, such as a gas (thermal) water heater, could be utilized and still fall within the scope of the invention. The water tank 11 has tank characteristics that are used in determining the thermal profile of the tank. The tank characteristics may include, but are not limited to, tank diameter, tank height, tank storage capacity, etc. The tank characteristics determine heating convection current flow patterns within the tank 11 that create different temperature water strata layers in the tank 11.

A water inlet line or dip tube 14 and a water outlet line 15 enter the top of the water tank 11. The water inlet line 14 has an inlet opening 22 for adding cold water near the bottom of the water tank 11. The water outlet line 15 has an outlet opening 24 for withdrawing hot water from near the top of the water tank 11.

A heating element 16 extends through the wall of the water tank 11. In the illustrated embodiment, the heating element 16 is an electric resistance heating element. However, it is understood that other types of heating elements, such as a thermal heating source, can be used. The temperature control circuitry in control box 17 is connected to the resistance heating element 16. The temperature control circuitry includes a controller, a temperature sensor assembly 18, and the heating element 16. In one construction, the temperature control circuitry includes a burst control circuit for providing power to the resistance heating element 16 in bursts. The details of a burst temperature control circuit are described in U.S. patent application Ser. No. 09/752,477, entitled PROPORTIONAL BAND TEMPERATURE CONTROL FOR ONE OR MORE HEATING ELEMENTS, filed Jan. 2, 2001, the entire disclosure of which is incorporated herein by reference. However, the temperature control circuitry can use other circuitries and other methodologies for heating the water.

In some constructions, the temperature control circuitry in control box 17 includes a programmable real time clock. Peak or off-peak energy demand periods or vacation operation cycles are programmed into the control cycle for the heating element. Additionally, a pressure sensor, temperature sensor, mineral deposit sensor and/or sensor detecting the presence of water could be added. In one method of operation of the water heater 10, the control circuit is programmed to disconnect power from the heating element when predetermined conditions or limits are detected.

Referring again to FIG. 1, the temperature sensor assembly 18 is coupled to the outer wall of the water tank 11 for sensing the temperature of water in the tank 11. The components of the temperature sensor assembly will be described in detail below. The position of the sensor assembly 18 on the tank surface depends, in one construction, on the tank characteristics. Determination of the correct position will also be described in detail below.

The temperature sensor assembly 18 is electrically connected to the controller (in control box 17), for example, by electrical wire 19. The controller is a known control system in the art that is in communication with the heating element 16 and the temperature sensor assembly 18, and generates a signal activating the heating element in response to the temperature sensed by the sensor assembly 18. The controller could be an integrated circuit, a programmable device, discrete circuit elements, a processor and memory that are software driven, etc. The controller may include a switching element (not shown), such as a thyristor or a triac, to selectively power the heating element.

Electric A.C. power is supplied to the water heater 10 through line 20. A customizable operator interface (not shown) can be mounted on the outside of the water heater to permit communication with the controller and provides security protected access for control of the heating element. The operator interface may be operable to provide direct or remote control of the heating element.

Figure 2:
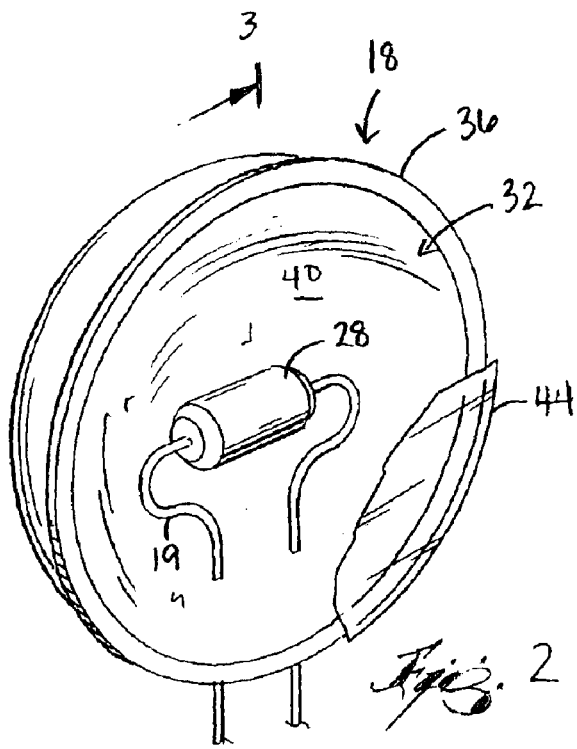
FIG. 2 is a front view of a temperature sensor assembly capable of being used in the water heater of FIG. 1.
Figure 3:
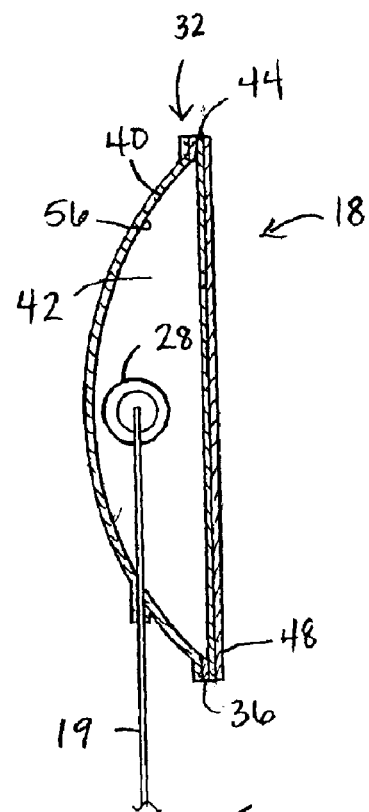
FIG. 3 is a sectional view of the temperature sensor assembly taken along line 3—3 of FIG. 2.

FIGS. 2 and 3 illustrate the temperature sensor assembly 18 according to one embodiment of the invention. The assembly 18 includes a sensor 28 mounted within a non-planar base 32. The temperature sensor is defined as any device capable of measuring the temperature of a coupled device, such as a water heater, a water cooler, a water tub, a refrigeration system, etc. The sensor 28 as illustrated is an NTC thermistor that is known in the art. It is understood that other types of thermistors can be used and still fall within the scope of the present invention. It is further understood that other sensing devices, such as a photovoltaic (solar) cell, a thermoelectric generator, a thermocouple, etc., can be used instead of a thermistor.

The non-planar base 32 of the illustrated construction is arcuate and includes a first surface 36 and a second surface 40. The base 32 comprises a thermally conductive material, such as aluminum foil or other known appropriate thermally conductive metal. The first and second surfaces 36, 40 at least partially define a volume 42 within the base. This volume can comprise empty space (i.e., air) or it can include a material, such as plastic or glass, which is sufficiently unrestrictive to thermal radiation.

An insulating standoff gasket 44 is coupled to the first surface 36 of the base 32. The gasket 44 is also coupled to the exterior surface of the tank 11 using a pressure sensitive adhesive. The gasket 44 helps prevent the sensor 28 from conducting heat through contact between the tank 11 and the first surface 36. The insulation may comprise a known low-density urethane foam, fiberglass, or any other appropriate insulating material. The gasket 44 also includes a collector 48.

In some constructions, the tank surface may be rough or dirty and thus not provide a good bonding surface. To compensate, the collector 48 includes a copper foil disk placed between the gasket 44 and the tank surface to increase the strength of the bond between the sensor assembly 18 and the tank 11.

A reflector 56 is coupled to the second surface 40 of the base 32. As illustrated, the reflector is parabolic in shape and the sensor 28 is placed at the focal point of the parabola. Generally, a sensor can measure the temperature of a very small area, such as a point, on a surface. If the sensor happens to measure a point that has an unusually high or low temperature compared to the rest of the environment, the sensor can generate a false reading. For example, if the sensor measures a point on the tank having a skewed temperature compared to the rest of the water in the tank (due to any number of variables that need not be described here), the sensor can falsely trigger the controller to activate/deactivate the heating element. This can waste energy or result in a water temperature that is below the desired temperature.

The parabolic configuration of the temperature sensor assembly 18 increases the effective sampling area of the sensor 28, thereby increasing the accuracy of the temperature sensing capacity of the sensor 28. As best shown in FIG. 2, the sensor 28 measures a sampling area having a relation to the circumference of the reflector 56 and is thus less likely to measure a false high or low temperature. This allows for more accurate temperature readings utilizing fewer sensors, thereby reducing the components required in the water heater and eliminating the need to average the sensor readings.

The reflector 56 comprises a highly reflective material, such as aluminum foil, mylar, electrostatically-coated plastic, or other known material having a high reflectivity (e.g., a 95% reflectivity or greater). This configuration allows the reflector to focus the heat radiated from the tank 11 to boost the signal to the sensor 28, further increasing the sampling area and efficiency of the sensor 28.

The reflector 56 can be insulated from temperatures external to the tank 11 by the insulation 13 in the space between the tank 11 and the shell 12. As illustrated in FIG. 1, there is no insulation 13 surrounding the reflector 56 (within the assembly 18). In the illustrated construction, outside insulation of the reflector 56 is not necessary to protect the reflector 56 from external temperatures. However, in other constructions (not shown), the temperature sensor assembly 18 is mounted on a different location of the tank 11 such that the assembly 18, and the reflector 56, is surrounded by the insulation 13.

While in the illustrated construction the temperature sensor assembly 18 is configured for use with a water heater, the sensor assembly 18 can be configured for use in many applications. For example, the sensor assembly 18 can be used with a room or building thermostat, in a temperature controlled bath, in industrial refrigeration systems, or in many other applications.

The above-described temperature sensor assembly 18 can be used to perform a method of sensing the temperature of the water in a water heater. To determine the proper placement of the sensor assembly 18 on a given water heater model (having a given tank capacity, tank height, and tank diameter), the first step is to determine a thermal profile of the tank 11. The temperature sensor assembly 18 is preferably located at a position on the tank that is typical of an average water temperature. Often, this is near the middle of the tank 11.

To determine the thermal profile of the tank (in the vertical dimension, for example), multiple sensors are placed at different vertical positions on the tank. In some arrangements, a sensor strip could be placed on the tank surface instead of individual sensors. The temperature readings of the sensors are averaged to determine the average temperature of the water in the tank. This average is then compared to the individual readings of the sensors to determine whether any of the sensors (or any portion of the sensor strip) recorded this average temperature reading. The sensor assembly 18 is then coupled to the tank at the median location between those sensors with the closest temperature readings to the average tank temperature. By so doing, the sampling area of the sensor 28 includes an area of average temperature.

Once the proper sensor assembly 18 location is determined for a given tank model, the sensor assembly 18 is coupled to the tank 11 in that position. The sensor 28 measures the temperature of the sampling area and sends a temperature signal to the controller via the wire 19. The controller then determines whether or not to activate the heating element.

Figure 4:
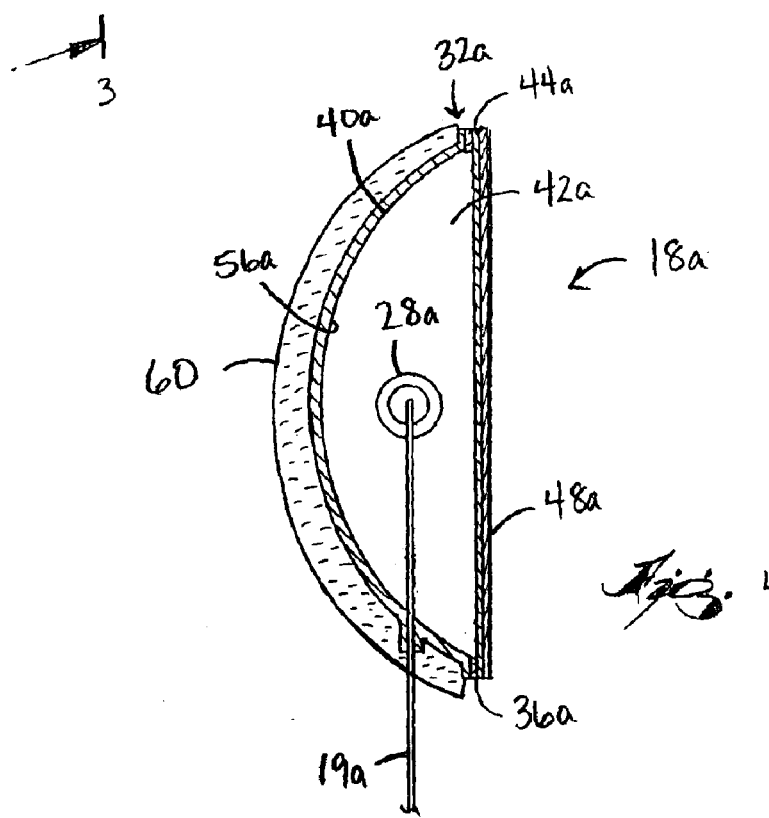
FIG. 4 is a sectional view of an alternative temperature sensor assembly capable of being used in the water heater of FIG. 1.

FIG. 4 illustrates the temperature sensor assembly according to another embodiment of the present invention. Similar components are given reference numeral "a".

The base 32a of the assembly 18a comprises a thermally conductive plastic. The thermally conductive plastic may be styrene, ABS, PVC, or any other known thermosetting plastic that is thermally conductive. The reflector 56a includes a layer of aluminum foil on the inner surface (facing the sensor 28a) of the reflector 56a. In some constructions, the outer surface of the reflector 56a is also be foiled. As illustrated in FIG. 4, the reflector 56a includes a layer of insulation 60 that both ensures that the sensor 28a is not conducting heat via contact with the base 32a and helps eliminate the influence of temperatures external to the water heater.

Various other features and advantages of the invention are set forth in the following claims.

What is claimed is:

1. A water heater, comprising:
   a water tank;
   a water inlet to introduce cold water into the tank;
   a water outlet to remove hot water from the tank;
   a heating element; and
   a temperature sensor assembly adapted to sense a temperature of the water within the tank and coupled to the exterior surface of the tank, the temperature sensor assembly comprising
      a non-planar base at least partially defining a volume,
      a sensor disposed within the volume,
      a collector coupled to the base and coupled to the water tank, and
      a reflector coupled to the base.

2. A water heater as set forth in claim 1, wherein the water tank has a characteristic, and wherein the characteristic is one of the tank diameter or the capacity of the tank, and wherein the position of the temperature sensor assembly on the exterior surface of the tank depends on the tank characteristic.

3. A water heater as set forth in claim 1, wherein the non-planar base is arcuate.

4. A water heater as set forth in claim 1, wherein the base comprises a thermally conductive material.

5. A water heater as set forth in claim 1, wherein the sensor includes an NTC thermistor.

6. A water heater as set forth in claim 1, wherein the collector includes a copper foil disk.

7. A water heater as set forth in claim 1, wherein the collector is insulated.

8. A water heater as set forth in claim 1, wherein the reflector comprises a highly reflective material.

9. A water heater as set forth in claim 8, wherein the highly reflective material comprises aluminum foil.

10. A water heater as set forth in claim 1, wherein the reflector is parabolic in shape, and wherein the sensor is placed at the focal point of the reflector.

11. A water heater as set forth in claim 1, wherein the reflector is insulated.

12. A water heater as set forth in claim 1, further comprising a controller in communication with the heating element and the temperature sensor, the controller operable to receive the sensed temperature from the temperature sensor and to generate a signal activating the heating element in response to the sensed temperature.

13. A water heater as set forth in claim 1, wherein the base includes a first surface and a second surface such that the collector is coupled to the first surface of the base and the reflector is coupled to the second surface of the base.

14. A temperature sensor assembly comprising:
   a non-planar base at least partially defining a volume;
   a sensor disposed within the volume;
   a collector coupled to the base; and a reflector coupled to the base, the reflector mounted such that the sensor and the reflector are not in thermal contact.

15. The temperature sensor assembly of claim 14, wherein the sensor includes an NTC thermistor.

16. The temperature sensor assembly of claim 14, wherein the non-planar base is arcuate.

17. The temperature sensor assembly of claim 14, wherein the base comprises thermally conductive material.

18. The temperature sensor assembly of claim 14 wherein the collector includes a copper foil disk.

19. The temperature sensor assembly of claim 14 wherein the collector is insulated.

20. The temperature sensor assembly of claim 14 wherein the reflector comprises a highly reflective material.

21. The temperature sensor assembly of claim 20, wherein highly reflective material comprises aluminum foil.

22. The temperature sensor assembly of claim 14, wherein the reflector is parabolic in shape, and wherein the sensor is placed at the focal point of the insulated reflector.

23. The temperature sensor assembly of claim 14, wherein the reflector is insulated.

24. The temperature sensor assembly of claim 14, wherein the sensor assembly is configured for use with a water heater having a water tank, and wherein the sensor assembly is coupled to the exterior of the water tank.

25. A temperature sensor assembly for sensing radiant heat, the sensor assembly comprising:

a thermally conductive arcuate base at least partially defining a volume;

a sensor disposed within the volume;

a copper foil collector coupled to the base, the collector being insulated; and a parabolic reflector comprised of highly reflective material, the parabolic reflector being coupled to the base and being mounted such that the sensor and the reflector are not in thermal contact.

26. The temperature sensor assembly of claim 25, wherein the sensor includes an NTC thermistor.

27. The temperature sensor assembly of claim 25, wherein the sensor is placed at the focal point of the reflector.

28. The temperature sensor assembly of claim 25, wherein the reflector is insulated.

29. The temperature sensor assembly of claim 25, wherein the sensor assembly is configured for use with a water heater having a water tank, and wherein the sensor assembly is coupled to the exterior of the water tank.

30. The temperature sensor assembly of claim 25, wherein the base includes a first surface and a second surface such that the copper foil collector is coupled to the first surface and the parabolic reflector is coupled to the second surface.

31. The temperature sensor assembly of claim 30, wherein the base has only first and second surfaces.

* * * * *